United States Patent [19]

Poirier

[11] Patent Number: 4,533,943
[45] Date of Patent: Aug. 6, 1985

[54] VIDEOCOMMUNICATION NETWORK BETWEEN VIDEOPHONE TERMINALS AND A PICTURE BANK

[76] Inventor: Alain Poirier, 82, rue de la République, Meudon, France, 92190

[21] Appl. No.: 511,385

[22] Filed: Jul. 6, 1983

[30] Foreign Application Priority Data

Jul. 30, 1982 [FR] France .................................. 82 13419

[51] Int. Cl.³ ....................... H04M 11/08; H04N 7/14
[52] U.S. Cl. ..................................... 358/85; 179/2 TS
[58] Field of Search ................. 179/2 R, 2 TV, 2 TS, 179/18 C; 358/85; 455/5

[56] References Cited

U.S. PATENT DOCUMENTS

| 3,662,110 | 5/1972 | Van Fossen et al. | 179/2 TS |
| 3,711,648 | 1/1973 | Whitney | 179/2 TS |
| 3,922,491 | 11/1975 | Björk et al. | 179/2 TV |
| 4,292,649 | 9/1981 | Macheboeuf | |

FOREIGN PATENT DOCUMENTS

| 29246 | 5/1981 | European Pat. Off. | |
| 100704 | 2/1984 | European Pat. Off. | 179/2 TS |

OTHER PUBLICATIONS

V. Berge et al., "The TN Television Telephone as a Data Sight Unit", *Nachrichten Telef. & Normalzeit*, (Germany), No. 72(1971), pp. 10–12.
Robin-Champigneul, Y. et al., "The French Videophone Set", Sid International Symposium, Digest of Technical Papers, Edition 1, May 1982, pp. 22–23.
Klein, P. et al., "Bildkommunikation mit Vicoset 200", Telcom Report, vol. 3, No. 2, Apr. 1980, pp. 117–121, Munchen, Germany (West).
Blineau, J. et al., "Didon: Data Packet Broadcasting System State of the Art", *Radiodiffusion–Television*, Feb. 1982, Paris, France.
"Didon–Antiope Technical Specifications", *Radiodiffusion–Television*, Jun. 1982, Paris, France.

*Primary Examiner*—Keith E. George
*Attorney, Agent, or Firm*—Lowe, King, Price & Becker

[57] ABSTRACT

A videocommunication network is connected between videophone terminals and a picture bank through voice switching units and wide-band switching units included in central offices. A purely telephonic communication can be established between two videophone terminals during a videocommunication between one of the two terminals and the picture bank. Once the videocommunication has been established between the videophone terminal and the picture bank via network voice switching units, the local telephone line assigned to the videophone terminal is automatically released while only a local wide-band line assigned to the videophone terminal is occupied for exchanging vision signals and also data signals with the picture bank via wide-band switching units.

15 Claims, 6 Drawing Figures

VIDEOCOMMUNICATION NETWORK BETWEEN VIDEOPHONE TERMINALS AND A PICTURE BANK

BACKGROUND OF THE INVENTION

1. Field of the Invention

The present invention relates to a videocommunication network between videophone terminals and a picture bank. Each videophonic terminal comprises audiofrequency means connected to a bidirectional telephone channel for transmitting and receiving audiofrequency signals, videofrequency means connected to a wide-band bidirectional channel for transmitting and receiving videofrequency signals, and means connected to the telephone channel for transmitting and receiving data signals. The picture bank comprises means selectively connected to one of several bidirectional telephone channels for transmitting and receiving data signals and means selectively connected to one of several wide-band channels for transmitting videofrequency signals.

2. Description of the Prior Art

In known videocommunication networks of this type, once the videocommunication link has been established between a subscriber videophone terminal and the picture bank through the exchange of data signals in compliance with a videotex protocol in telephone lines or channels, a wide-band communication link connects, the via wide-band switching units in the network, the picture bank videofrequency signal transmitting means to the terminal videofrequency signal receiving means. Throughout the videocommunication, which lasts generally a long time, the terminal telephone line is connected to the corresponding picture bank telephone line, with a view to possibly exchange data, especially for selecting recorded programs in the picture bank.

Under these conditions, the subscriber cannot use the local telephone line as normal for an audio dialog with another subscriber.

Additionally, the vision representing signals transmitted by the picture bank are routed by the videophone switching means within the network, which can give rise to congestion of the initially planned traffic for the purely videophone communications, the duration of the videocommunication with the picture bank being very long.

OBJECT OF THE INVENTION

The main object of this invention is to provide a videocommunication network between videophonic terminals and a picture bank whereby a purely telephonic communication can be established between two terminals during a videocommunication link between one of the two terminals and the picture bank. In other words, once the videocommunication link has been established between the terminal and the picture bank via network voice switching means, the videophone terminal telephone line is automatically released while only the terminal wide-band line is occupied for exchanging vision representing signals and data signals with the picture bank via wide-band switching means of the network.

SUMMARY OF THE INVENTION

In a videophone terminal embodying the invention, first switching means connects a bidirectional telephone channel such as a normal subscriber telephone line, to audiofrequency signal transmitting and receiving means, such as a telephone set, when the videophone terminal is in communication with another subscriber videophone terminal or another subscriber telephone set. When a videocommunication is to be established between the videophone terminal and the picture bank, the first switching means connects the telephone channel to data signal transmitting and receiving means for exchanging a first data signal through a telephone channel link of the telephone network. Videofrequency signal transmitting means comprising a camera included in the videophone terminal is then disconnected from the wide-band transmitting channel associated with the terminal, and videofrequency signal receiving means comprising a color cathode ray tube included in the videophone terminal is always connected to the wide-band receiving channel associated with the terminal.

After the exchange of the first data signals, a second data signal is transmitted from the picture bank and is multiplexed with the videofrequency signal on the videofrequency receiving channel of the videophone terminal. Responsive to the second data signals, the first switching means connects again the audiofrequency channel to the telephone set, and a second switching means connects the data signal transmitting means to the wide-band transmitting channel.

Thus after reception of the second data signals, the telephone channel is released and is available for a telephone communication between the telephone set of the videophone terminal and another telephone set. The data signal transmitting and receiving means can exchange data signals with the picture bank through the wide-band channels. In the wide-band receiving channel, the data signals provided from the picture bank are mixed with a vision signal including a composite video signal and a sound signal. The received data are visualized in a portion of the screen of the color cathode ray tube at the same time as the moving pictures of the requested program, by means of a picture combining process.

Advantageously, the band width of the wide-band receiving channel carrying the vision signal including a composite video signal and a sound signal is not modified for transmitting the data signals simultaneously. The data signals are in effect inserted in digital data packet form in free lines, such as lines of the frame synchronizing signal, of the composite video signal. In the other transmission direction, from the videophone terminal to the picture bank, the wide-band channel can be a telephone channel carrying the data in modulated-signal form in an audiofrequency band, i.e. conventionally in the telephone band 0.3 to 3.4 or 4 kHz.

In a preferred embodiment of the invention, the traffic brought about by the communications between the videophone terminals and the picture bank does not saturate the network wide-band or video switching units intended for the purely videophone communications between the terminals. The invention does not make use of blockage-free wide-band switching units as they are too expensive. In each central office of the network is provided a second wide-band switching unit which is intended for routing only the videocommunications between the terminals and the picture bank.

BRIEF DESCRIPTION OF THE DRAWING

Other objects and advantages of the present invention will become apparent by reading the following detailed description of several preferred embodiments with reference to the corresponding appended drawings, in which.

DESCRIPTION OF THE PREFERRED EMBODIMENTS

Figure 1:
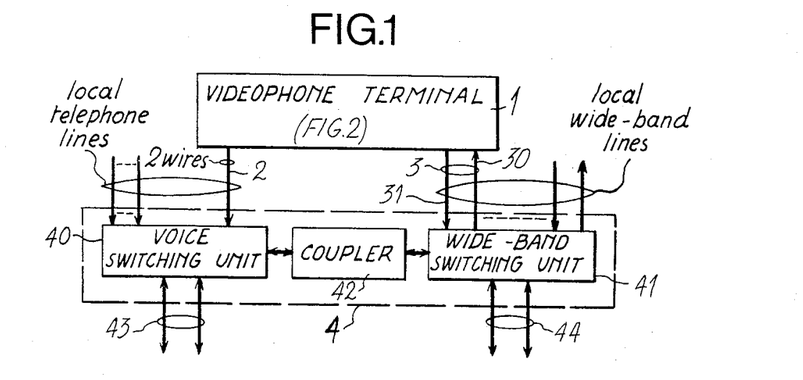
FIG. 1 is a schematic block diagram of the telephone and wide-band central office to which a videophone terminal subscribes.

As schematically depicted in FIG. 1, a subscriber videophone terminal 1 embodying the invention is connected via a telephone line 2 and a wide-band line 3 to a local central office 4.

The telephone line 2 is bidirectional and comprises two wires. The line 2 carries audiofrequency signals that are exchanged between audiofrequency transmitting and receiving means included in the terminal 1 and a voice switching unit 40 included in the central office 4. Generally, the line 2 transmits and receives through the public telephone network audiofrequency signals such as voice signals exchange between two telephone or videophone subscribers, or such as modulated data signals exchange between the videophone subscriber and a data or picture bank.

Figure 2:
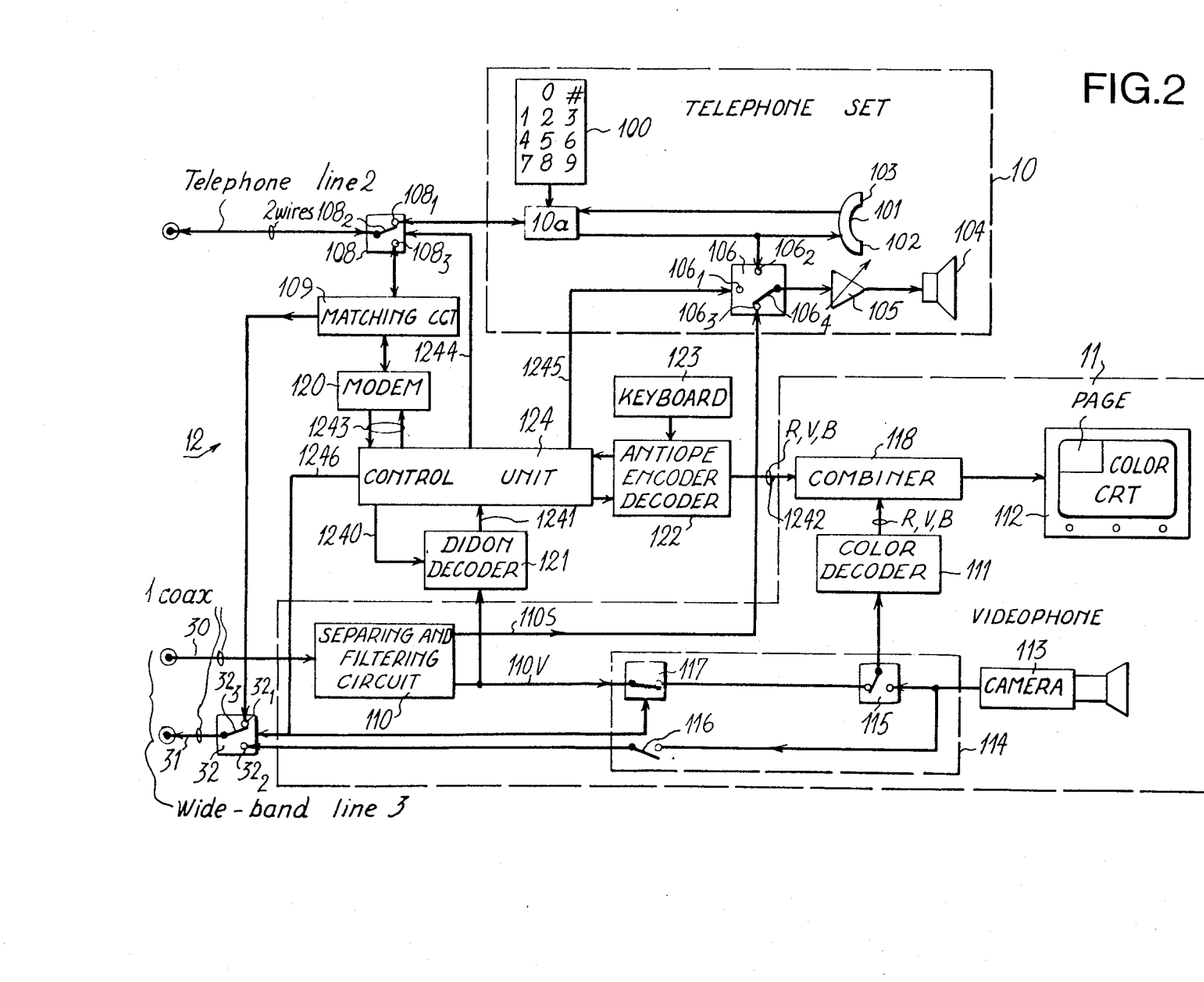
FIG. 2 is a detailed block diagram of a videophone terminal in accordance with the invention.

As shown in FIG. 2, the audiofrequency transmitting and receiving means in the terminal 1 has the form of a conventional subscriber telephone set 10 with amplified loudspeaker reception. The telephone set 10 comprises a keyboard 100, a handset 101 with earphone 102 and microphone 103, a loudspeaker 104 for receiving amplified audiosignals by means of an adjustable gain amplifier 105, together with a switching circuit 10a connecting the telephone line 2 conventionally to the members 102, 103 and 105.

The wide-band line 3 includes a wide-band unidirectional incoming line 30 and a wide-band unidirectional outgoing line 31. The lines 30 and 31 carry vision signals that are exchanged between videofrequency transmitting and receiving means 11 included in the terminal 1 and a wide-band or video switching unit 41 included in the central office 4 shown in FIG. 1. A vision signal is made up of the conventional combination of a composite video signal and a sound signal in accordance with a color television standard adopted for the videophone terminals and the picture bank. The composite video signal includes three conventional primary signals that are, for instance, the luminance signal Y and the two chrominance or so-called color difference signals R-Y and B-Y or that are generally speaking ascribed to three monochromatic coordinates derived from the primary component video signals assigned to red R, green G and blue B and applicable to a color television tube.

Included conventionally in the videofrequency transmitting and receiving means 11 of the terminal 1 depicted in FIG. 2 are a separating and filtering circuit 110, a composite video signal color decoder 111 and a color television cathode ray tube 112—the latter are analogous to those in a traditional television receiver—together with a color television camera 113 and an analog switching circuit 114. The terminal can include, accessorily, one or several video monitors (not shown) for the purpose of displaying pictures of greater dimensions than those in the cathode ray tube 112.

The circuit 110 receives the analog vision signal in the incoming line 30 from either a videophone terminal or the picture bank, and demultiplexes the vision signal into the sound signal on a lead 110 S and the composite video signal on a lead 110 V. The lead 110 S is connected to a stationary contact $106_3$ of the two-position switch 106 with an intermediate position $106_1$. Another stationary contact $106_2$ of switch 106 is connected to the listening lead of the telephone set 10 linked up to the earphone 102. Movable contact $106_4$ in the switch 106 is connected to the input of the amplifier 105. The movement of the movable contact $106_4$ between contacts $106_2$ and $106_1$ enables the subscriber to listen to his correspondent either privately through the earphone 102 or with other people through the loudspeaker 104, as is known. The connection of the contacts $106_3$ and $106_4$ disconnects the loudspeaker 104 from the earphone 102 and causes reception of the sound associated with the program transmitted from the picture bank.

Switching circuit 114 is connected to respond to the signal on lead 110 V, as well as the video output from the camera 113 and to supply signals to the input of the decoder 111, as well as to outgoing wide-band line 31. The circuit 114 comprises a two-position switch 115, having a movable contact connected to the input of the decoder 111. Two stationary contacts of switch 115 are respectively connected to the video output from the separating and filtering circuit 110 via the lead 110 V, and to the output from the camera 113. By means of the switch 115, the subscriber selects either the picture of his correspondent or the picture transmitted by the picture bank, or his own closed circuit picture. The circuit 114 also comprises a switch 116 between the camera 113 output and the outgoing line 31. The switch 116, when open, prevents transmission of the subscriber's picture, should the subscriber not wish his picture to be transmitted to his correspondent. The circuit 114 comprises further another switch 117 that is series-connected to the lead 110 V and inhibits display of the correspondent's picture.

The videophone terminal 1 also comprises data signal transmitting and receiving means 12. Before going into the relationships between the data transmitting and receiving means 12 and the telephone set 10 and video transmitting and receiving means 11 in detail, an outline is given below of the leading features regarding data signal transmission.

The data signals are required for the exchange of information between the videophone terminal 1 and the picture bank for the subscriber to dialog with the picture bank either for the purpose of selecting a program recorded in the picture bank or for using the picture bank as an interactive dialog terminal, e.g. a computer terminal. The selection takes place in accordance with a specific or known videotex protocol (interactive videography) whereby the signals permit the various equipment connections and disconnections in the terminal embodying the invention. The data signals are transmitted partly in the telephone line 2 and partly in the wide-band lines 30 and 31.

Transmission of data signals in the lines 2 and 31 is done via a standard modem 120 (modulator-demodulator). The modem 120 operates with two nominal average frequencies respectively different for the two transmission directions and operates in duplex mode for the telephone line 2. As is known, the modulation is a bivalent series modulation obtained by frequency displacement. For each transmission direction, the two binary states correspond to two predetermined frequencies having a half-sum equal to the respective nominal frequency.

The data signal received from the incoming line 30 is in the videotex mode proper, i.e. the data signal is adapted to be simultaneously transmitted with the incoming vision signal to be displayed on the cathode ray tube 112. In a preferred embodiment, the data transmission mode for the line 30 complies with the standards of the French DIDON system (registered trademark; "DIffusion de DONnées"—Data Diffusion) and the videotex encoding is of the sort involved in the French ANTIOPE system (registered trademark; "Acquisition Numérique et Télévisualisation d'Images Organisées en Pages d'Ecritures"—Digital Acquisition and Televisualization of Written-Page Organized Pictures). The characteristics of the DIDON system and the ANTIOPE system are briefly summarized below in reference particularly to two special editions of the French publication "Radiodiffusion-Television"; one edition is entitled "DIDON: DATA PACKET BROADCASTING SYSTEM. STATE OF THE ART", by Joseph BLINEAU, Guy DUBLET, Yves NOIREL and Jean-Claude VARDO, February 1982, Paris (FR) and the other is entitled "DIDON-ANTIOPE. Technical specifications", June 1982, Paris (FR).

Figure 3:
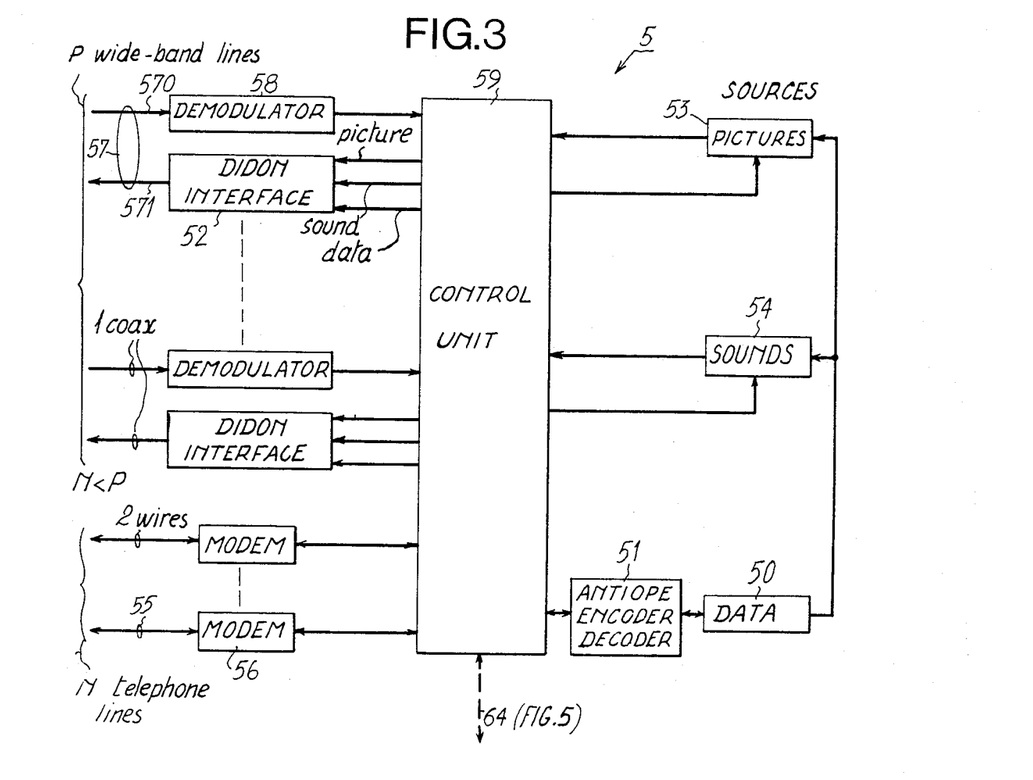
FIG. 3 is a schematic block diagram of a picture bank in accordance with the invention.

The picture bank 5 shown in FIG. 3 comprises a data source 50 transmitting written pages in the form of octet sequences in one or generally several digital channels. Each octet sequence is split into data blocks to which a heading is added to constitute a data packet in an encoder 51 included in an encoder/decoder of the ANTIOPE type. The heading further comprises a digital channel identifying word that is the same for all packets of the same digital channel.

An encoding interface 52 including a DIDON encoder receives the various digital channels and the vision signal selected from a picture and sound source 53, 54. DIDON encoding interface 52 multiplexes the digital channels packet by packet and inserts the packets to the extent of one packet per active portion of free line of the transmitted composite video signal. A free line is a line having an active portion not occupied by the picture signal itself. A free line may be a line included in a frame synchronizing and blanking interval. However, when a program is not transmitted, the majority of the other lines can be occupied by packets, thus corresponding to full channel use. After multiplexing the digital channels, the DIDON encoding interface 52 multiplexes the data packets with the vision signal, i.e. modulates the luminance signal of the free lines by the packets. A multiplexed signal of this nature, vision +data, is received via the wide-band line 30.

With reference again to FIG. 2, the digital data signal transmitting and receiving means 12 in the videophone terminal 1 mainly comprises, besides the modem 120, a DIDON decoder 121, an ANTIOPE encoder-decoder 122 associated with a corresponding special purpose keyboard 123 and a control unit 124.

The DIDON decoder 121 receives the composite video signal multiplexed with the data signal on the output lead 110 V, as derived from the separating and filtering circuit 110. The essential function of the decoder 121 is to extract, by means of a demodulator, the digital data channels from the incoming composite video signal in order to deliver the extracted channels in series digital form, and to select, by means of a demultiplexer, the packets of a digital channel from among the received packets. The address of the digital channel to be selected is provided by the control unit 124 to the decoder 121, via a lead 1240. The selected channel address is compared for each enabled received packet with the channel identifying word so that the decoder 121 supplies the unit 124 via a bus 1241 with only the data blocks of the selected digital channel. The data blocks of the selected channel are then processed in the ANTIOPE decoder 122 whereupon each character in the videographic message received in digital form is decoded into video signals in keeping with the standard adopted, suitable for display on the cathode ray tube 112, via a video bus 1242.

The control unit 124 is designed around a microprocessor. The unit 124 is also connected to the modem 120 via a bidirectional bus 1243. Processing of the videotex protocol and in particular the various connections and disconnections between equipments included in the terminal 1 is controlled by the unit 124. A description now follows of how a videocommunication is established between the terminal 1 and the picture bank 5 together with the switching means peculiar to the invention in the terminal 1.

To call the picture bank 5, the subscriber uses the keyboard 123. To seize telephone line 2 through the modem 120, the subscriber passes a particular key on the keyboard 123, thereby also energizing videofrequency transmitting and receiving means 11 and data transmitting and receiving means 12. The control unit 124 changes the state of two-position switch 108. Movable contact $108_2$ of switch 108 initially connects the telephone line 2 to one stationary contact $108_1$ of switch 108 that is connected to the circuit 10a in the telephone set 10. When the state of switch 108 is changed, the telephone set 10 is disconnected from the line 2 and the movable contact $108_2$ is applied to another stationary contact $108_3$ of the switch 108 which is connected to the modem 120 via an impedance matching circuit 109. The subscriber dials the picture bank call number on the keyboard 123 and the modem 120 is then in communication with the picture bank 5, once the local central office relating to the picture bank has selected one of its local telephone lines 55, as will be seen hereinafter.

When the picture bank modem 56 (FIG. 3) has recognized the call transmitted by the local central office 4 associated with the videophone terminal, the central office automatically earmarks the line 55 and transmits a return signal at a first predetermined audiofrequency. The demodulator of modem 120 supplies a signal to unit 124 to indicate that the first predetermined audiofrequency has been detected. After several check signals peculiar to the videotex protocol have been exchanged with unit 124 to indicate the transmission of a subscriber identity word to the picture bank, the unit 124 orders the transmission of a signal having a second predetermined audiofrequency from the modem 120 modulator. The detection of the second audiofrequency is interpreted as a "ready to receive" signal by the picture bank modem 56. The picture bank 5 is then in a condition to transmit the data required by the subscriber and to dialog with the videophone terminal 1.

The picture bank 5 then delivers, via its modem 56, a first written page in ANTIOPE videotex language; the first written page is received by the telephone line 2 and the modem 120 and is decoded in the decoder 122 for display on the cathode ray tube 112. The tube 112 input video channel is connected to the output of the color decoder 111 and to the output of the decoder 122 via a known combiner 118 for combining color television pictures.

The first written page tells the subscriber that the terminal 1 is in communication with the picture banks and that the telephone line 2 is soon going to be released for normal use.

After a predetermined time interval, the picture bank 5 transmits a second written page that is carried by wide-band means in the network and received by the unit 12Y through the incoming line 30, the circuit 110 and the DIDON decoder 121. The second written page is displayed on the tube 112 screen and can be superimposed on a moving picture and visualized by being combined in combiner 118. The combiner 118 comprises switching circuits having a variable amplification factor or a variable high switching speed switching circuits. The latter switching circuits make it possible to combine the component signals R, G and B of the so-called foreground scene picture representative of a written page delivered by the output 1242 of the decoder 122 and the component signals R, G and B of the so-called background scene representative of a moving picture delivered by the output of the decoder 111 to give component signals R, G and B of a picture resulting from the combination of the foreground scene with the background scene. The combiner 118 permits visualization of characters especially in a corner of the tube 112 screen. The combiner 118 can be analogous to a composite video signal combining system described in U.S. Pat. No. 4,292,649.

Detection of the identifying word for the digital channel carrying the second written page or detection of the presence of the line synchronizing and blanking signal by the unit 124 and the decoder 121 causes release of the telephone line 2 and connection of line 2 to the telephone set 10 which has remained in an on-hook condition. This operation is performed by the unit 124 which, via leads 1244, 1245 and 1246, controls switching of previously mentioned switches 106, 108, 117 and another two-position switch 32. Movable contact $32_3$ of switch 32 is connected to the outgoing wide-band line 31. Contact $32_3$ engages one stationary contact $32_2$ of switch 32, connected to the switch 116 when the terminal 1 is in videophone communication. In this particular instance, the contact $32_3$ engages another stationary contact $32_1$ of the switch 32 so as to disconnect the camera 113 from the line 31 and to connect the line 31 to the modem 120 via the impedance matching circuit 109. The circuit 109 is designed to match on the one hand, the two-wire bidirectional line 2 to the modem 120, and on the other hand, the unidirectional coaxial line 31 to the modem 120 modulator.

Detection of the second written page further causes switching in the switches 108 and 106. The movable contact $108_2$ engages the stationary contact $108_1$ thereby linking the telephone line 2 to the telephone set 10. The movable contact $106_4$ engages with the contact $106_3$ thereby linking the sound output lead 110 S of the circuit 110 to the loudspeaker 104 via the amplifier 105.

The picture bank 5 releases the previously selected telephone line 55 after transmission of the second written page, thereby telling the voice switching unit in the picture bank local central office that the telephone communication has been broken.

Visualization of the second written page can tell the subscriber that he may re-use the telephone set 10 to dialog orally with another subscriber having either a straightforward telephone set or a videophone terminal; in the case where the two subscribers have videophone terminals, the pictures of the subscribers are not transmitted because one of the wide-band lines 3 assigned to a subscriber is occupied by a picture signal. The second page provides a visual indication, for example, of the various programs that the picture bank is capable of supplying, accompanied with relevant code numbers. The subscriber dialogs with the picture bank in the videotex mode using the special purpose keyboard 123. During the entire videocommunication, the modem 120 transmits either digital characters delivered from the encoder 122, or a carrier frequency at, for instance, the nominal frequency corresponding to the transmission direction in question in the absence of any dialog, on the outgoing wide-band line 31. On the other hand, the vision signal possibly multiplexed with the DIDON digital channels is delivered by the picture bank in a chosen outgoing wide-band line 571 from the picture bank and in the incoming wide-band line 30 of the terminal 1. Written pages are displayed via the combiner 118, for example in one of the corners on the cathode ray tube 112 screen.

Display of these written pages is controlled either directly by the subscriber, to select another program for example, or directly by the picture bank, to indicate the imminent end of a program for example.

Throughout the entire videocommunication, the picture bank monitors the presence of the aforesaid carrier frequency which indicates that the subscriber is still desirous of entering into communication with the picture bank.

The videocommunication can be ended by the subscriber pressing a given key of the keyboard 123. This operation is interpreted by the unit 124 to cancel transmission of the carrier frequency by the modem 120 modulator in the terminal 1. At this stage, the switches 106, 117 and 32 revert to the rest position, i.e. to the opposite condition of that depicted in FIG. 2, the video transmitting and receiving means 11 and data transmitting and receiving means 12 are disconnected from the local supply source. The absence of the carrier frequency is detected by the demodulator 58 in the corresponding incoming wide-band line 570 of the picture bank 5 which, after a time interval, finally releases the whole wide-band communication link. The release can be achieved by the transmission of modulated information from the picture bank data source 50 to the picture bank local central office which reroutes an equivalent information item to the other wide-band central offices in the communication link. Release can also be achieved by detecting an absence of the video signal, notably absence of the line synchronizing signal, in the wideband switching units of the communication link. The video signal absence is controlled by detecting an absence of the carrier frequency transmitted by the modulator 120 in the videophone terminal 1 or by stopping the program transmitted by the picture bank.

However, the end of the videocommunication can be brought about by the picture bank 5, for instance by the absence of the vision signal and thus of the line synchronizing signal, or by the absence of the identifying word for a given DIDON digital channel, whereupon said absence is detected by the decoder 121 and the unit 124.

In the foregoing process for establishing the videocommunication between the videophone terminal 1 and the picture bank 5, it was assumed that a first written page was initially transmitted on the telephone line and that a second written page was transmitted on the wide-band line. In a further embodiment, the first written page can be deleted whereby the "second" written page would again bring about release of the telephone line.

Should the picture bank 5 be inaccessible because the wide-band lines 57 serving it are occupied, the picture bank transmits a second vidiotex page to the calling subscriber in the selected telephone line 55. This second page indicates the current state of the picture bank and gives instructions to the subscriber. The instructions enable the subscriber, using the special purpose keyboard 123 and via the modem 120 and the telephone line 2, to ask, for example, for deferred access to the picture bank programs at a predetermined time when the picture bank will call back the subscriber by transmitting a new written page via the telephone lines.

A voice and wide-band communication link is described hereafter. The link includes one or more voice and wide-band central offices, such as local central office 4 serving a videophone terminal 1, shown in FIG. 1, or serving the picture bank 5 shown in FIG. 4. Each central office 4 comprises a voice switching unit 40 for switching telephone lines, a wide-band switching unit 41 for switching wide-band lines and a coupler 42 including a microprocessor device. The voice switching unit 40 serves local subscriber telephone lines such as lines 2 and/or 55 as well as bidirectional telephone links 43 connected to other voice switching units. The wide-band switching unit 41 serves local subscriber wide-band lines such as lines 3 and/or 57, as well as wide-band links 44 connected to other wide-band switching units. The links 43 and 44 between central offices can be simple lines, each carrying a communication, or wide-band lines in which the frequency-multiplexed channels are respectively ascribed to the communications in progress. A wide-band switching unit can be analogous to a high capacity video switching grid used in a television studio such as that described in the article by C. SURJON, THOMSON CSF Technical Review, Vol. 12, No. 4, pages 867 to 881, December 1980.

The main function of the coupler 42 is to make a wide-band or videophone communication link correspond to a telephone or voice communication link, or the associated wide-band subscriber line correspond to a subscriber telephone line. Putting this another way, the wide-band switching unit 41 is a slave to the voice switching unit 40 and is activated for a videophone communication once the corresponding telephone communication has been established in the voice switching unit 40. Further, as is known, once the telephone communication has been broken, the matrix 40 orders the videophone communication in the matrix 41 to be broken via a signal coupled through the coupler 42.

The picture bank 5 shown in FIG. 3 is served by N telephone lines 55 and P wide-band lines 57. Because the occupation time of telephone line 55, i.e. from seizing up to the transmission of the second written page, is very much shorter than the occupation time of a wide-band line 57, generally that of the program, N is chosen much smaller than P. According to the invention, for the videocommunications with the picture bank 5, the wide-band switching unit 41 remains activated until such time as it has detected a disconnection order that is peculiar to a videocommunication with the picture bank 5 and that is independent of the disconnection order from the voice switching unit for a videophone communication.

The invention proposes two embodiments for connecting the P wide-band lines 57 to the picture bank 5 local central office, where the N telephone lines 55 are always connected to the voice switching unit 40 of the picture bank local central office.

Figure 4:
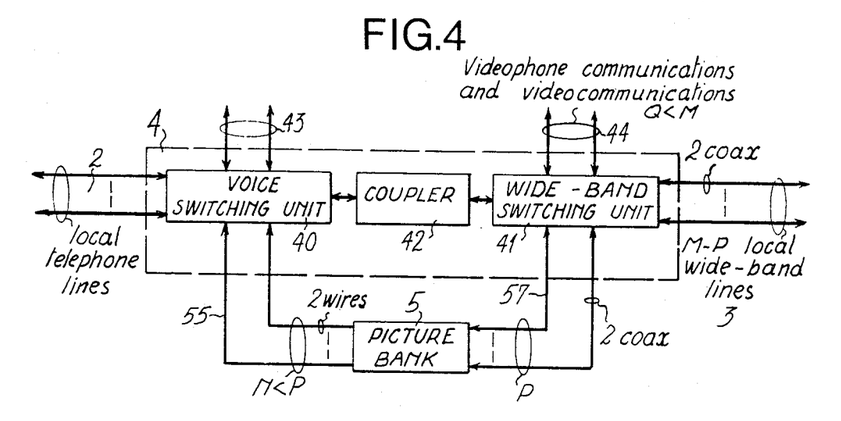
FIG. 4 is a schematic block diagram of the telephone and wide-band central office to which the picture bank subscribes, in accordance with a first embodiment.

In the first embodiment illustrated in FIG. 4, the P wide-band lines 57 are connected directly to the wide-band matrix 41. M-P subscriber wide-band lines 3 are also connected to videophone terminals for local subscribers. The specific orders for hold, connection and occupation or any analogous orders for the connection points in the wide-band switching unit 41 are transmitted from the matrix 40 to the coupler 42 having considerably modified software. On the other hand, the disconnection order of two switching paths in the unit 41 for a videocommunication with the picture bank 5 is detected by the unit 41 and the coupler 42, when the carrier from the subscriber terminal modem 120 is absent or when, for instance, the line synchronizing signal from the picture bank is absent. Every time a videocommunication from an outside subscriber is established with a picture bank telephone line 55, the coupler 42 must ascribe a wide-band channel in the link 44 to the videocommunication; several telephone communications in the same line 55 at different times can give rise to as many video channel occupations in the link 44 and wide-band lines 57. By way of this occupation, there is a restriction then on the number of purely videophone communications between the local subscribers and remote subscribers.

Each time the P wide-band lines 57 are simultaneously occupied, the occupations restrict the number of purely videophone communications within the wide-band switching unit 41.

By way of example, if Q represents the maximum number of video channels in the link 44, i.e. the maximum number of purely videophone communications that the matrix 41 could initially switch, with $Q<M$, the matrix 41 can switch at the most only $Q+(M-P)-P$ purely videophone communications if the P wide-band lines 57 are simultaneously occupied for videocommunications with the picture bank 5. In this case, within the wide-band switching unit 41 there can be difficulties regarding purely videophone communications traffic due to the very lengthy nature of the videocommunications with the picture bank.

Figure 5:
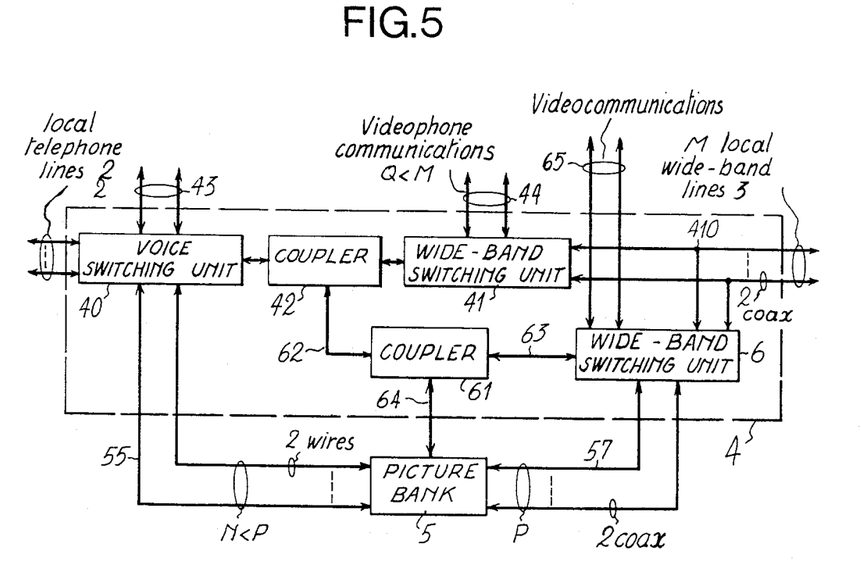
FIG. 5 is a schematic block diagram of the telephone and wide-band central office to which the picture bank subscribes, in accordance with a second embodiment.

The second embodiment illustrated in FIG. 5 overcomes this drawback. The wide-band lines 57 of the picture bank 5 are connected to an additional wide-band switching unit 6 that is also connected to M wide-band lines 3 of the local subscribers connected to the wide-band switching unit 41. Each subscriber wide-band line 3 is connected to the units 41 and 6 via two impedance matching circuits 410 schematically shown by interconnection points in FIGS. 5 and 6. In the second embodiment, an additional coupler 61 processes the connections and disconnections in the additional unit 6. The information to establish wide-band communications is supplied via a bus 62 to the coupler 61 by the unit 40 and/or the coupler 42, having software that is not modified here; the information concerning the breaking of wide-band communications is supplied to the coupler 61, either by the unit 6 via a bus 63, or by the picture bank itself via a bus 64.

The advantage of this second embodiment is that the addition of the unit 6, having reduced capacity compared to the unit 41, does not trouble the purely videophone traffic initially planned in the unit 41 when the picture bank is connected to the existing network. Indeed, only the videophone communications from the wide-band lines 3 and from the link 44 are switched in the local unit 41. The traffic of these videophone communications is not troubled in any way by the traffic between the local subscribers and the picture bank 5 or between the picture bank and a bidirectional wide-band link 65 which carries video signals between the local unit 6 and units, such as unit 6 included in the other central offices. Indeed, for a communication between the picture bank 5 and a subscriber line 3, the signals run directly through the additional unit 6; in this case, the coupler 61 allocates a videocommunication path in the unit 6 to the videocommunication while a videocommunication path in the unit 41 is left free for a videophone communication between two other subscribers. Reciprocally, when a line 3 carries a videophone communication, a videocommunication path in the unit 6 is left free for a communication between the picture bank 5 and another subscriber, either local via a local line 3, or remote via the link 65.

The embodiment illustrated in FIG. 5 offers the advantage that the number of lines 57 that can serve the picture bank is greater than that provided for in FIG. 4, where the increase in the number of lines 57 can be brought about by adding wide-band modules forming the unit 6 without modifying the traffic and the videophone capacity initially planned in the central office 4.

Figure 6:
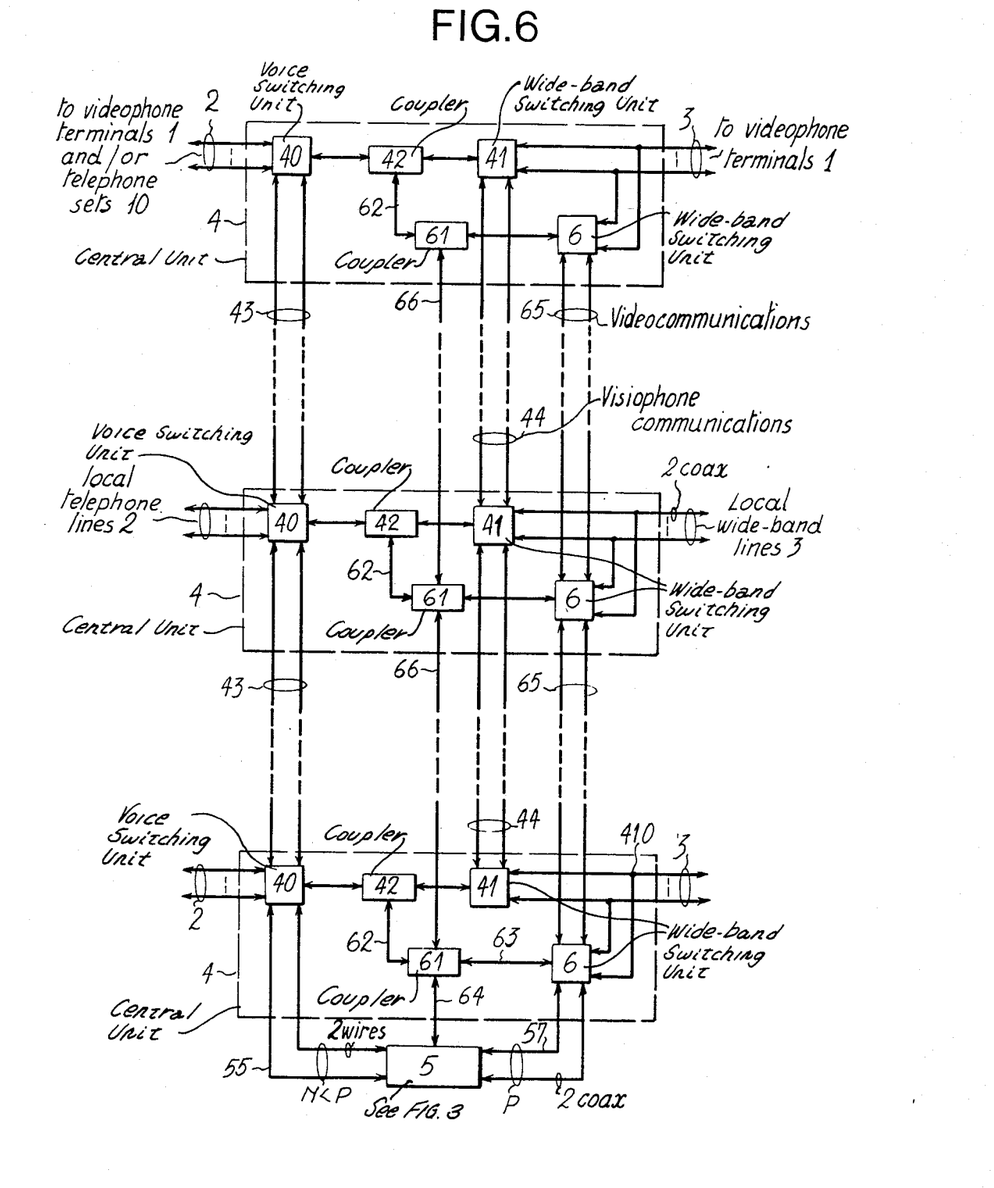
FIG. 6 is a detailed block diagram of a communication link-up via the network in accordance with the second embodiment, between a videophone terminal and the picture bank.

FIG. 6 is a schematic diagram of a wide-band communication link between the picture bank 5 local central office, such as shown in FIG. 5, and the local central office of a videophone terminal 1 through several central offices 4. Each central office 4 includes an additional coupler 61 and an additional wide-band switching unit 6 similar to those shown in FIG. 5. The additional wide-band switching units 6 are intended solely for videocommunications with the picture bank 5. Links 66, e.g. semaphore channel types, interconnect the additional couplers 61 of the different central offices 4. The links 66 make it possible to transmit especially the connection, disconnection and occupation orders of the switching paths in the wide-band switching units 6, from one end to the other of a videocommunication link.

The release of the videocommunication link can be achieved by one of several processes depending on the end, terminal or picture bank, that first breaks the videocommunication:

(a) If the subscriber hangs up first, transmission of the nominal carrier frequency in the terminal 1 is cancelled and then the absence of the carrier frequency is detected,
  (a1) in the wide-band switching units 6 of the central offices, thereby causing release of the corresponding videocommunications paths in the units 6, or
  (a2) in the picture bank 5, thereby causing one of the following steps (b1) and (b2);
(b) The picture bank takes the initiative of breaking the videocommunication, then
  (b1) the picture bank sends an end-of-communication order on the bus 64 to the additional local coupler 61 to which the picture bank 5 is connected, and coupler 61 retransmits the order end-of-communication to the other couplers 61 via the links 66, thereby releasing the corresponding videocommunication paths in the units 6, or
  (b2) the halting of picture transmission from the bank 5 makes it possible in each circuit 6, by detecting means provided therefor, to detect the absence of the vision signal, such as the absence of the line synchronizing signal; the detecting means then controls release of the corresponding videocommunication paths in the units 6 of the link; for the latter embodiment, the bus 64 can be eliminated.

Wide-band switching unit 6 can be divided into two sub-units, one ascribed to the transmission of vision and data signals between the DIDON encoding interfaces 52 and the DIDON decoders 121 and the other ascribed to the transmission of the data signals between the modulators 120 and the demodulators 58, where the band width for the latter transmission direction can be smaller.

With reference once again to the schematic block diagram in FIG. 3, the picture bank 5 is now described in more detail. The picture bank is organized in an analogous fashion to the known data banks utilized for transmitting programs set out in videotex written pages. The picture bank 5 is connected to the associated local central office 4 (FIG. 4 or 5) by N telephone lines 55 and P wide-band lines 57 each including two coaxial cables, with $N<P$. Connected to each telephone line 55 is a modem 56. Each wide-band line 57 is made up of an incoming coaxial line 570 that is connected to a demodulator 58 and an outgoing coaxial line 571 that is connected to a video matching interface 52, making it possible to multiplex the sound signal with the video composite signal and to multiplex the outgoing data signal with the vision signal in accordance with the DIDON standard.

The picture bank 5 further comprises picture sources 53 including video tapes carrying recorded programs, and sound sources 54 partly related to and partly independent of the picture sources 53, as well as data sources 50 including an encoder-decoder 51 of the ANTIOPE type.

The various sources 50–51, 53 and 54 are connected to the units 56, 52 and 58 through a control unit 59 that is organized around a microprocessor and which plays a switching rôle between the various units on the line side and the various means on the source side. The unit 59 particularly monitors the presence of the nominal carrier transmitted by the modulator 120 of a subscriber terminal 1 that can be received either by a telephone line 55 and the modulator of the associated modem 56 while video communication is being established, or by an incoming wide-band line 570 and the associated demodulator 58 during the videocommunication. The unit 59 is in close relation with the encoders and decoders 51, especially to monitor selection of a picture and sound source 53–54 in terms of subscriber requirements and source availability.

It has been assumed that the telephone voice communications and the videocommunications were transmitted in analog form by two analog lines such as lines 2 and 3 or lines 55 and 57. The procedure for establishing and breaking a videocommunication can also be put into practice through local lines and bidirectional lines carrying a digital or frequency channel multiplex. The transmission medium for these lines can be a pair of coaxial cables or optical fibers. A subscriber line carries at least one channel for voice and at least one channel for the vision data signal or purely data signal. In this case, the terminal and the picture bank comprise known circuits for the frequency separation or digital demultiplexing of the channels in one transmission direction and other known circuits for the frequency multiplexing or digital multiplexing of the channels in the other transmission direction.

It will further be noted that the picture bank 5 can be a bank of purely static pictures, such as pages of data corresponding to the videotex transmission mode, or a bank of moving pictures corresponding to the transmission mode of a television standard.

What I claim is:

1. A videocommunication network comprising plural (N) videophone terminals and a picture bank,
   videophone terminal K comprising: first switching means, audiofrequency means for transmitting and receiving audiofrequency signals of a telephone communication, said audiofrequency means being connected through said first switching means to a bidirectional telephone channel videofrequency means connected to a wide-band transmitting channel for transmitting videofrequency signals and connected to a wide-band receiving channel for receiving videofrequency signals, and data means for transmitting and receiving first data signals through said first switching means and said telephone channel while a videocommunication is established between terminal k and said picture bank, where k is selectively each of 1 . . . N;
   said picture bank comprising: second and third switching means, data means for transmitting and receiving said first data signals from said terminals, said data means being connected through said second switching means to several bidirectional telephone channels serving said picture bank, and means for transmitting vision representing signals to said terminals, said vision representing signal transmitting means being connected through said third switching means to several wide-band channels serving said picture bank, several multiplexing means connected to be responsive to signals from said second and third switching means and to supply signals to said several wide-band transmitting channels for sequentially transmitting a second data signal peculiar to releasing said telephone channels carrying said first data signals as derived from said second switching means and third data signals multiplexed with a vision signal as derived from said third switching means, the transmission of the multiplexing means occurring after said videocommunication between one of said videophone terminals and said picture bank has been established, said picture bank data means being connected through said second switching means to one of said several wide-band channels for receiving third data signals from said terminal after said telephone channels have been released;
   videophone terminal k further comprising: means connected to said wide-band receiving channel of terminal k for detecting said second and third data signals transmitted from said picture bank multiplexing means and for delivering the detected second and third data signals to said terminal data receiving means, fourth switching means for selectively connecting said terminal wide-band transmitting channel to said videofrequency transmitting means for a videophone communication with another videophone terminal and to said terminal data transmitting means in response to said second data signal being detected,
   said first switching means of said videophone terminal being selectively connected to said audiofrequency transmitting and receiving means and to said terminal telephone channel in response to said second data signal being detected.

2. The videocommunication network of claim 1 wherein each of said multiplexing means includes means for inserting said data signals in digital packet form to the extent of one packet in a free line of a composite video signal included in said vision representing signal.

3. The videocommunication network of claim 1 wherein said data signal transmitting and receiving means of videophone terminal k are connected to said first and fourth switching means via a modem and a two-wire bidirectional telephone line and a two-conductor wide-band transmitting line impedance matching means, and wherein each wide-band receiving channel of the picture bank is connected directly to a demodulator thereby receiving data signals from a videophone terminal.

4. The videocommunication network of claim 1 wherein videophone terminal k comprises a color cathode ray tube and video combining means connected to said data signal receiving means and to said videofrequency signal receiving means so as to visualize, through said cathode ray tube, pictures representative of received data combined with pictures corresponding to the received videofrequency signals.

5. The videocommunication network of claim 1 wherein videophone terminal k comprises means independent of said audiofrequency signal transmitting and receiving means for activating said data signal transmitting and receiving means and said videofrequency signal transmitting and receiving means and for simultaneously controlling said first switching means to thereby connect said telephone channel to said data transmitting and receiving means.

6. The videocommunication network of claim 1 wherein videophone terminal k comprises: a loudspeaker connected to be responsive to an amplifier output, means connected to said wide-band receiving channel for separating and filtering a sound signal and a composite video signal received in said wide-band receiving channel, and fifth switching means for selectively connecting an input of said amplifier to respond to a filtered output signal of a sound channel of said separating means in response to detection of said second data signal, and to said audiofrequency transmitting and receiving means of a videophone or telephone communication.

7. The videocommunication network of claim 1 wherein the number of said bidirectional telephone channels serving said picture bank is less than the number of the wide-band bidirectional channels serving said picture bank.

8. The videocommunication network of claim 1 comprising plural central offices, each central office including a master voice switching unit for switching local telephone bidirectional channels between the different central offices and with other remote telephone bidirectional channels, and a wide-band switching unit acting as a slave to said telephone switching unit for switching local wide-band bidirectional channels between different local bidirectional channels, and for switching local wide-band bidirectional channels with other remote wide-band bidirectional channels, said telephone channels and said wide-band channels serving said picture bank being directly connected to telephone and wide-band switching units in a local central office assigned to said picture bank respectively.

9. The videocommunication network of claim 8 wherein said videophone terminal data signal transmitting means transmits a predetermined signal in the terminal wide-band transmitting channel during the entire duration of a videocommunication with said picture bank, said wide-band switching units through which said videocommunication runs releasing the wide-band channels carrying said videocommunication in response to said predetermined signal not being detected.

10. The videocommunication network of claim 8 wherein said wide-band switching units through which a videocommunication runs releases wide-band channels carrying said videocommunication in response to a particular signal not being detected, said particular signal being normally transmitted from said picture bank during said videocommunication.

11. The videocommunication network of claim 1 wherein said videophone terminal data signal transmitting means transmits a predetermined signal in the terminal wide-band transmitting channel during the entire duration of a videocommunication with said picture bank, said picture bank wide-band data signal receiving means releasing the wide-band channels carrying said videocommunication in response to said predetermined signal not being detected.

12. The videocommunication network of claim 1 further comprising: plural central offices each including a master voice switching unit for switching local telephone bidirectional channels between the local telephone bidirectional channels and for switching local telephone bidirectional channels with other remote telephone bidirectional channels; and a wide-band switching unit acting as a slave to said telephone switching unit for switching local wide-band bidirectional channels between local wide-band bidirectional channels and for switching local wide-band bidirectional channels with other remote wide-band bidirectional channels, said telephone channels serving said picture bank being connected directly to a voice switching unit in a local central office assigned to the picture bank; each central office other than said picture bank local central office comprising: a second wide-band switching unit for switching local wide-band bidirectional channels with second remote wide-band bidirectional channels connected to other second wide-band switching units only for videocommunications with said picture bank; and said picture bank local central office comprising a second wide-band switching unit for switching local and remote wide-band bidirectional channels with the wide-band channels serving said picture bank.

13. The videocommunication network of claim 12 wherein said videophone terminal data signal transmitting means transmits a predetermined signal in the terminal wide-band transmitting channel during the entire duration of a videocommunication with said picture bank, said second wide-band switching units through which said videocommunication runs releasing the wide-band channels carrying said videocommunication in response to said predetermined signal not being detected.

14. The videocommunication network of claim 12 wherein each central office comprises means in relation with those of the other central offices for releasing the linked wide-band channels in said second wide-band switching units when a particular signal from said picture bank is transmitted to said local central office assigned to said picture bank.

15. The videocommunication network of claim 12 wherein said second wide-band switching units through which a videocommunication runs releases wide-band channels carrying said videocommunications in response to a particular signal not being detected, said particular signal being normally transmitted from said picture bank during said videocommunication.

* * * * *